United States Patent
Korhonen et al.

(10) Patent No.: US 10,813,126 B2
(45) Date of Patent: Oct. 20, 2020

(54) SIGNALING FOR UPLINK SHORT TRANSMISSION TIME INTERVAL TRANSMISSIONS

(71) Applicant: Nokia Technologies Oy, Espoo (FI)

(72) Inventors: Juha Sakari Korhonen, Espoo (FI); Ankit Bhamri, Helsinki (FI); Timo Erkki Lunttila, Espoo (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 16 days.

(21) Appl. No.: 16/319,875

(22) PCT Filed: Jul. 25, 2017

(86) PCT No.: PCT/FI2017/050554
§ 371 (c)(1),
(2) Date: Jan. 23, 2019

(87) PCT Pub. No.: WO2018/029396
PCT Pub. Date: Feb. 15, 2018

(65) Prior Publication Data
US 2019/0268934 A1  Aug. 29, 2019

Related U.S. Application Data

(60) Provisional application No. 62/373,098, filed on Aug. 10, 2016.

(51) Int. Cl.
H04W 72/14 (2009.01)
H04L 5/00 (2006.01)
(Continued)

(52) U.S. Cl.
CPC .......... *H04W 72/14* (2013.01); *H04L 5/0051* (2013.01); *H04L 5/0053* (2013.01);
(Continued)

(58) Field of Classification Search
CPC ... H04L 5/0007; H04L 5/0051; H04L 5/0053; H04L 5/0082; H04L 5/0094;
(Continued)

(56) References Cited

U.S. PATENT DOCUMENTS 9,137,076 B2 * 9/2015 Luo ..................... H04L 27/2613
9,461,807 B2 * 10/2016 Takeda ................. H04L 1/0003
(Continued)

FOREIGN PATENT DOCUMENTS

EP  3391685 A1  10/2018
JP  2009527187 A1  7/2009
(Continued)

OTHER PUBLICATIONS

Huawei et al., DMRS enhancement of V2V, Feb. 15, 2016, 3GPP, 3GPP TSG RAN WG1 Meeting #84, Tdoc: R1-160284 (Year: 2016).*

(Continued)

*Primary Examiner* — Eric Nowlin
(74) *Attorney, Agent, or Firm* — Squire Patton Boggs (US) LLP

(57) ABSTRACT

Various communication systems may benefit from appropriate coordination of measurements for mobility or other reasons. For example, Long Term Evolution communication systems may benefit from signaling for uplink short transmission time interval transmissions. A method can include determining how a user equipment is to transmit with respect to a demodulation reference signal. The method can also include providing uplink grant to schedule the user equipment to transmit according to the determination.

20 Claims, 7 Drawing Sheets

(51) Int. Cl.
  *H04L 27/26* (2006.01)
  *H04W 72/12* (2009.01)
(52) U.S. Cl.
  CPC .......... *H04L 5/0082* (2013.01); *H04L 5/0094* (2013.01); *H04L 27/2613* (2013.01); *H04W 72/12* (2013.01); *H04W 72/1268* (2013.01); *H04L 5/0007* (2013.01)
(58) Field of Classification Search
  CPC .............. H04L 27/2613; H04W 72/04; H04W 72/0406; H04W 72/0446; H04W 72/12; H04W 72/1268; H04W 72/14
  See application file for complete search history.

(56) References Cited

U.S. PATENT DOCUMENTS

| | | | | |
|---|---|---|---|---|
| 2011/0128909 | A1* | 6/2011 | Luo | H04L 5/0023 370/328 |
| 2014/0293900 | A1* | 10/2014 | Takeda | H04L 1/0003 370/329 |
| 2016/0157294 | A1 | 6/2016 | Li et al. | |
| 2017/0289992 | A1* | 10/2017 | Sun | H04L 5/0051 |
| 2018/0331807 | A1* | 11/2018 | Kim | H04L 29/06 |
| 2019/0007248 | A1* | 1/2019 | Takeda | H04L 27/2607 |
| 2019/0081722 | A1* | 3/2019 | Takeda | H04W 72/0446 |
| 2019/0149288 | A1* | 5/2019 | Hosseini | H04L 5/0082 370/329 |
| 2019/0149295 | A1* | 5/2019 | Wang | H04W 72/0446 370/336 |
| 2019/0327759 | A1* | 10/2019 | Lee | H04L 5/0053 |
| 2019/0357248 | A1* | 11/2019 | Takeda | H04W 72/04 |
| 2020/0008228 | A1* | 1/2020 | Lee | H04L 5/001 |
| 2020/0037346 | A1* | 1/2020 | Takeda | H04L 5/0051 |
| 2020/0052841 | A1* | 2/2020 | Takeda | H04J 13/004 |

FOREIGN PATENT DOCUMENTS

| | | |
|---|---|---|
| JP | 2015510352 A | 4/2015 |
| WO | 2007/130011 A1 | 11/2007 |
| WO | 2013/125840 A1 | 8/2013 |
| WO | 2013/149664 A1 | 10/2013 |
| WO | 2014/161142 A1 | 10/2014 |
| WO | 2014/168574 A1 | 10/2014 |
| WO | 2014/178764 A1 | 11/2014 |
| WO | 2015/000171 A1 | 1/2015 |
| WO | 2016/040290 A1 | 3/2016 |
| WO | 2017/056020 A1 | 4/2017 |
| WO | 2017/078595 A1 | 5/2017 |
| WO | 2017/132841 A1 | 8/2017 |
| WO | 2018/030981 A1 | 2/2018 |

OTHER PUBLICATIONS

Intel Corporation, Sidelink DMRS enhancements for V2V communication, Feb. 15, 2016, 3GPP, 3GPP TSG RAN WG1 Meeting #84, Tdoc: R1-160430 (Year: 2016).*
CMCC, Discussion on DMRS Enhancement for PC5-based V2V, Feb. 15, 2016, 3GPP, 3GPP TSG RAN WG1 Meeting #84, Tdoc: R1-160497 (Year: 2016).*
LG Electronics, Discussion on DMRS enhancements for PC5-based V2V, Feb. 15, 2016, 3GPP, 3GPP TSG RAN WG1 Meeting #84, Tdoc: R1-160633 (Year: 2016).*
Sony et al., Discussion on DMRS enhancement and operation for V2V, Feb. 15, 2016, 3GPP, 3GPP TSG RAN WG1 Meeting #84, Tdoc: R1-160677 (Year: 2016).*
Beijing Xinwei Telecom Techn., Link performance of DMRS Enhancement for PC5-based V2V, Feb. 15, 2016, 3GPP, 3GPP TSG RAN WG1 Meeting #84, Tdoc: R1-160792 (Year: 2016).*
Nokia Networks et al., Evaluation of DMRS options for V2V with high Doppler, Feb. 15, 2016, 3GPP, 3GPP TSG RAN WG1 Meeting #84, Tdoc: R1-160912 (Year: 2016).*
Nokia et al., On DMRS enhancements for V2V—Summary, Apr. 15, 2016, 3GPP, 3GPP TSG RAN WG1 Meeting #84bis, Tdoc: R1-162540 (Year: 2016).*
Nokia et al., Evaluations of DMRS Enhancement for PSCCH and PSSCH, May 23, 2016, 3GPP, 3GPP TSG RAN WG1 Meeting #85, Tdoc: R1-165041 (Year: 2016).*
Tentative Rejection received for corresponding Taiwan Patent Application No. 106122562, dated Jan. 8, 2019, 7 pages of Tentative Rejection and 3 pages of translation available.
Office action received for corresponding Japanese Patent Application No. 2018-566894, dated Jan. 8, 2020, 8 pages of office action and 5 pages of translation available.
"Definition of DCI bit Fields for Short TTI", 3GPP TSG-RAN WG1 Meeting #84bis, R1-163323, Ericsson, Agenda item: 7.3.10,2, Apr. 11-15, 2016, 5 pages.
"Views on TTI Length", 3GPP TSG-RAN WG1 Meeting #84bis, R1-162108, Huawei, Agenda item: 7.3.10,2, Apr. 11-15, 2016, 5 pages.
"On Requirements of DM-RS Design for UL Shorter TTI", 3GPP TSG-RAN WG1 Meeting #86, R1-167018, Nokia, Agenda item: 7.2.12.2.1, Aug. 22-26, 2016, 4 pages.
"New SI Proposal: Study on Latency Reduction Techniques for LTE", 3GPP TSG RAN Meeting #67, RP-150465, Ericsson, Agenda Item: 13.1.2, Mar. 9-12, 2015, 8 pages.
"New Work Item on Shortened TTI and Processing Time for LTE", 3GPP TSG RAN Meeting #72, RP-161299, Ericsson, Agenda Item: 10.1.1, Jun. 13-16, 2016, 9 pages.
"3rd Generation Partnership Project; Technical Specification Group Radio Access Network; Evolved Universal Terrestrial Radio Access (E-UTRA); Study on latency reduction techniques for LTE (Release 14)", 3GPP TR 36.881, V14.0.0, Jun. 2016, 249 pages.
International Search Report and Written Opinion received for corresponding Patent Cooperation Treaty Application No. PCT/FI2017/050554, dated Sep. 29, 2017, 15 pages.
"Study of Shorter TTI for Latency Reduction", 3GPP TSG-RAN WG2 #91 bis, R2-154740, Ericsson, Agenda Item : 7.10.2, Oct. 5-9, 2015, pp. 1-8.
"On Signaling Details for Flexible DMRS in UL Shorter TTI", 3GPP TSG-RAN WG1 Meeting #86bis, R1-1609163, Nokia, Agenda item: 7.2.12.2.1, Oct. 10-14, 2016, 4 pages.
Extended European Search Report received for corresponding European Patent Application No. 17838863.3, dated Mar. 3, 2020, 9 pages.
"UL Channel Design for Shortened TTI", 3GPP TSG-RAN WG1 Meeting #85, R1-164459, Qualcomm Incorporated, Agenda item: 6.2.10.1, May 23-27, 2016, 8 pages.
Korean Office Action issued in corresponding Korean Patent Application No. 10-2019-7006693 dated May 21, 2020.
European Office Action issued in corresponding European Patent Application No. 17 838 863.3-1205 dated Jun. 19, 2020.

* cited by examiner

| Format Index | Symbol 0 | Symbol 1 | Symbol 2 | Symbol 3 |
|---|---|---|---|---|
| 0 | R | | | |
| 1 | | R | | |
| 2 | | | R | |
| 3 | D | D | | |
| 4 | | D | D | |
| 5 | | | D | D |
| 6 | D | | D | |
| 7 | | D | | D |
| 8 | R | D | D | |
| 9 | | R | D | D |
| 10 | D | R | D | |
| 11 | | D | R | D |
| 12 | D | D | R | |
| 13 | | D | D | R |
| 14 | | | | |
| 15 | | | | |

Table 1

Figure 2

SIGNALING FOR UPLINK SHORT TRANSMISSION TIME INTERVAL TRANSMISSIONS

RELATED APPLICATION

This application was originally filed as PCT Application No. PCT/FI2017/050554 on Jul. 25, 2017, which claims priority from U.S. Application No. 62/373,098 filed on Aug. 10, 2016.

BACKGROUND

Field

Various communication systems may benefit from appropriate coordination of measurements for mobility or other reasons. For example, Long Term Evolution communication systems may benefit from signaling for uplink short transmission time interval transmissions.

Description of the Related Art

Third generation partnership project (3GPP) long term evolution (LTE) releases 13 and 14 (Rel-13/14) may include an LTE-Advanced Pro system. More specifically, there is a Rel-13 Study Item, "Study on Latency reduction techniques" RP-150465 and the follow-up Work Item RP-161299 that is based on the Study Item. The conclusions of the Study Item are captured into the 3GPP technical report (TR) 36.881 and they indicate that processing time is related to physical layer radio latency.

The changes associated with this study item and work item include introduction of shorter transmission time interval (TTI) (sTTI) operation with reduced processing times. For Frame structure type 1 [RAN1, RAN2, RAN4], the changes may specify support for a transmission duration based on 2-symbol sTTI and 1-slot sTTI for short physical downlink shared channel (sPDSCH)/short physical downlink control channel (sPDCCH) and may specify support for a transmission duration based on 2-symbol sTTI, 4-symbol sTTI, and 1-slot sTTI for sPUCCH/sPUSCH. Down-selection is not precluded. The use of "s" in combination with other abbreviations such as PUCCH or PUSCH can refer to "short," "shorter," "shortened" or the like, without limitation.

The performance in link level throughput conventionally decreases with shorter TTI lengths. This is primarily due to the increased relative overhead from the uplink (UL) demodulation reference signals (DMRS).

SUMMARY

According to a first embodiment, a method can include determining how a user equipment is to transmit with respect to a demodulation reference signal. The method can also include providing uplink grant to schedule the user equipment to transmit according to the determination.

In a variant, the determination can include that the user equipment is to transmit only a demodulation reference signal without data symbols.

In a variant, the determination can include that the user equipment is to transmit a plurality of data symbols without a demodulation reference signal.

In a variant, the determination can include that the user equipment is to transmit a plurality of data symbols and a demodulation reference signal.

In a variant, the determination can include that the transmission of data and/or demodulation reference signals is discontinuous.

In a variant, the uplink grant can be configured to indicate a delay of one or two symbols with respect to a nominal delay.

In a variant, how the user equipment is to transmit with respect to a demodulation reference signal can include transmitting according to a selected format of a set of formats.

In a variant, the selected format can be signaled by a set of bits indicating the format.

In a variant, the formats can be grouped and downlink control information can include a switch to a group.

In a variant, a particular format can be indicated using modulation and coding scheme bits or demodulation reference signal cyclic shift bits.

In a variant, the downlink control information can include bits indicative of the group or the downlink control information can be subject to group dependent cyclic redundancy code scrambling.

The above variants can be used in combination with one another.

According to a second embodiment, a method can include receiving an uplink grant to schedule the user equipment to transmit according to a determination with respect to a demodulation reference signal. The method can also include communicating in uplink by the user equipment in accordance with the determination.

The second embodiment can also include any of the variants of the first embodiment in any combination.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein:

FIG. 2 illustrates Table 1, a table of combinations of transmit formats, according to certain embodiments.

DETAILED DESCRIPTION

Certain embodiments relate to, for example, short physical uplink shared channel (sPUSCH) operation for example with 2-symbol short transmission time interval (sTTI). Certain embodiments more particularly relate to uplink (UL) demodulation reference signals, and the related signaling allowing flexible reference signal transmission.

Having multiple sTTIs using the same DMRS can help in mitigating performance loss described above. For example, having DMRS in every second or third short TTI and/or multiplexing DMRS of different user equipment (UEs) on the same resource may significantly reduce the total DMRS overhead and thus increase the throughput. Certain embodiments provide a signaling scheme for such flexible DMRS transmission.

Figure 1:
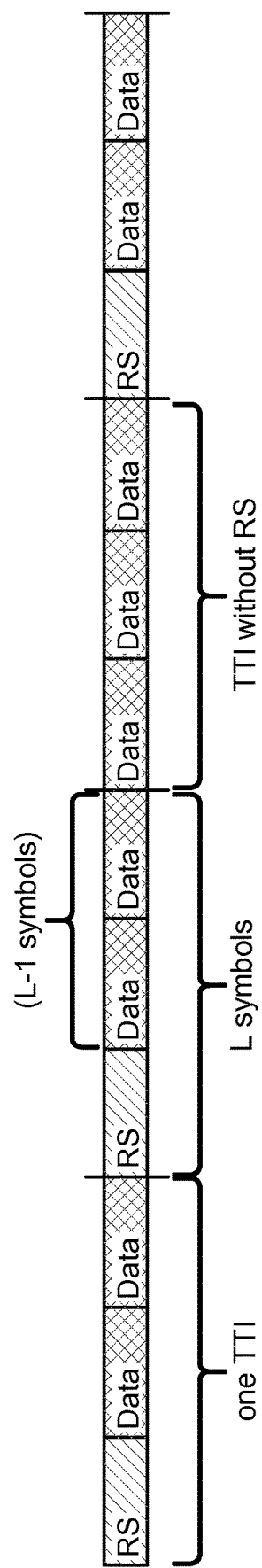
FIG. 1 illustrates a transmission time arrangement for sPUSCH.

FIG. 1 illustrates a transmission time arrangement for sPUSCH. As shown in FIG. 1, each transmission time interval can include L symbols, in this case three symbols. There can be one or no reference symbols (RS) and either L or L−1 data symbols, in this case two or three symbols. Such arrangement allows reducing DMRS overhead but a drawback of the solution is that the number of data symbols in an sTTI varies depending on whether UL DMRS are present in the given sTTI or not. As the work item in RP-161299 considers also 2-symbol sTTI, there would be a rather drastic difference in the number of resources available depending on whether the sTTI contains UL DMRS or not (double the resources are available when RS is not present). This kind of fluctuation of the amount of resources is undesirable, as it complicates scheduler operation in terms of e.g. link adaptations, retransmissions and the related control signaling design. Instead, it would be preferable to have the sTTI always containing a constant number of resources available for data. Certain embodiments provide a solution fulfilling this design criterion.

In addition, flexibility provided by certain embodiments may be beneficial in view of UL grant transmission in downlink (DL). Detailed design of DL control signaling for sTTI does not exist yet, but UL grants for sTTI may be transmitted both on PDCCH and sPDCCH. If, as may be the case, the number of PDCCH symbols can change dynamically from 1 to 3 and a grant is decodable only after reception of the last PDCCH symbol, the timing and the number of UL grants per subframe may be variable. The signaling design for UL grants may provide efficient use of UL resources even in presence of such variations.

Certain embodiments may facilitate efficient and flexible signaling for determining DMRS and data symbol transmission for sTTI operation. This signaling may allow an access node, such as an evolved node B (eNB), to adjust the amount of overhead according to UE or eNB needs. For example, UEs with higher mobility may need to transmit a DMRS symbol close in time to the data symbols, or even transmit two DMRS symbols to allow an eNB to interpolate the channel estimates.

For example, an eNB can use an UL grant to schedule a UE to transmit according to one of the following options: only DMRS symbol alone; two data symbols without DMRS symbol; or a combination of a DMRS symbol and two data symbols. Other options are also permitted. Additionally, the UL grant may indicate delay of one or two symbols with respect to a nominal delay. The UL grant may be transmitted on PDCCH or sPDCCH.

Figure 3:
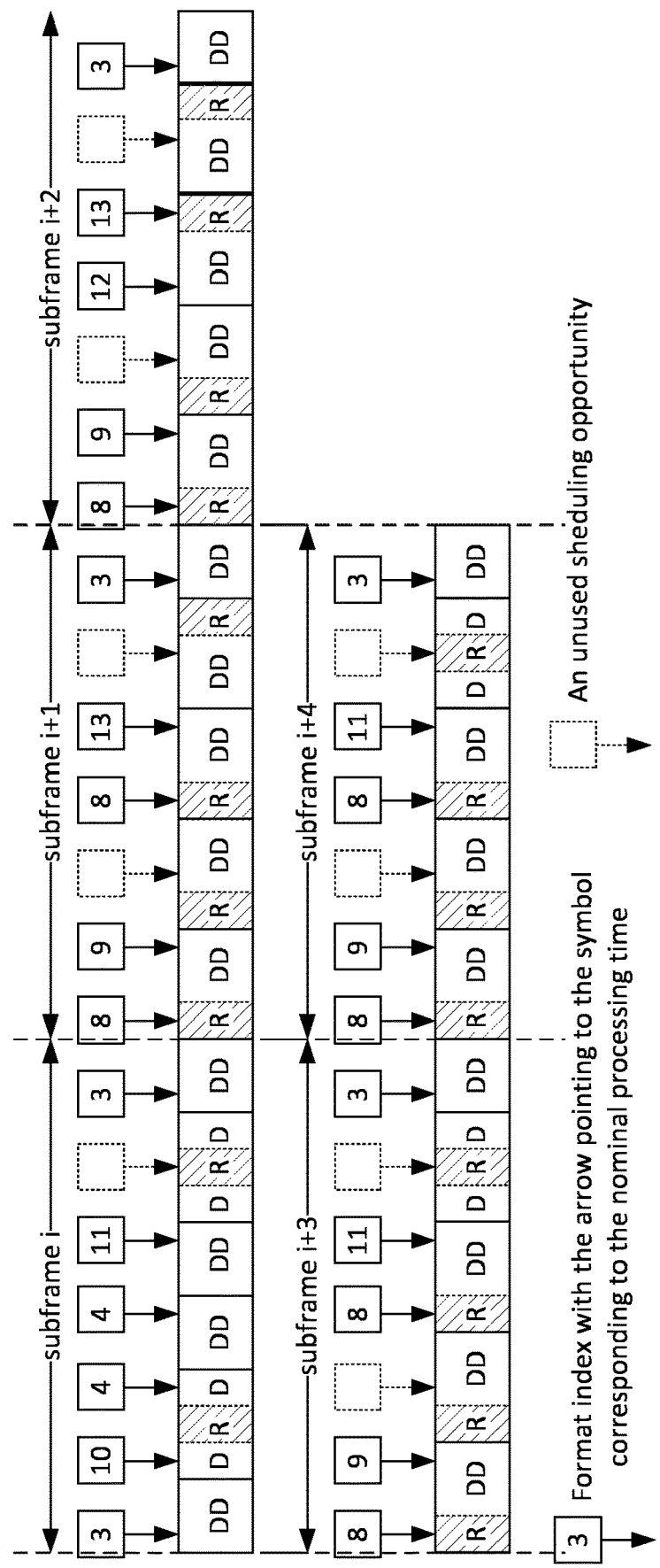
FIG. 3 illustrates an eNB scheduling different sTTI formats within five consecutive UL subframes, according to certain embodiments.
Figure 4:
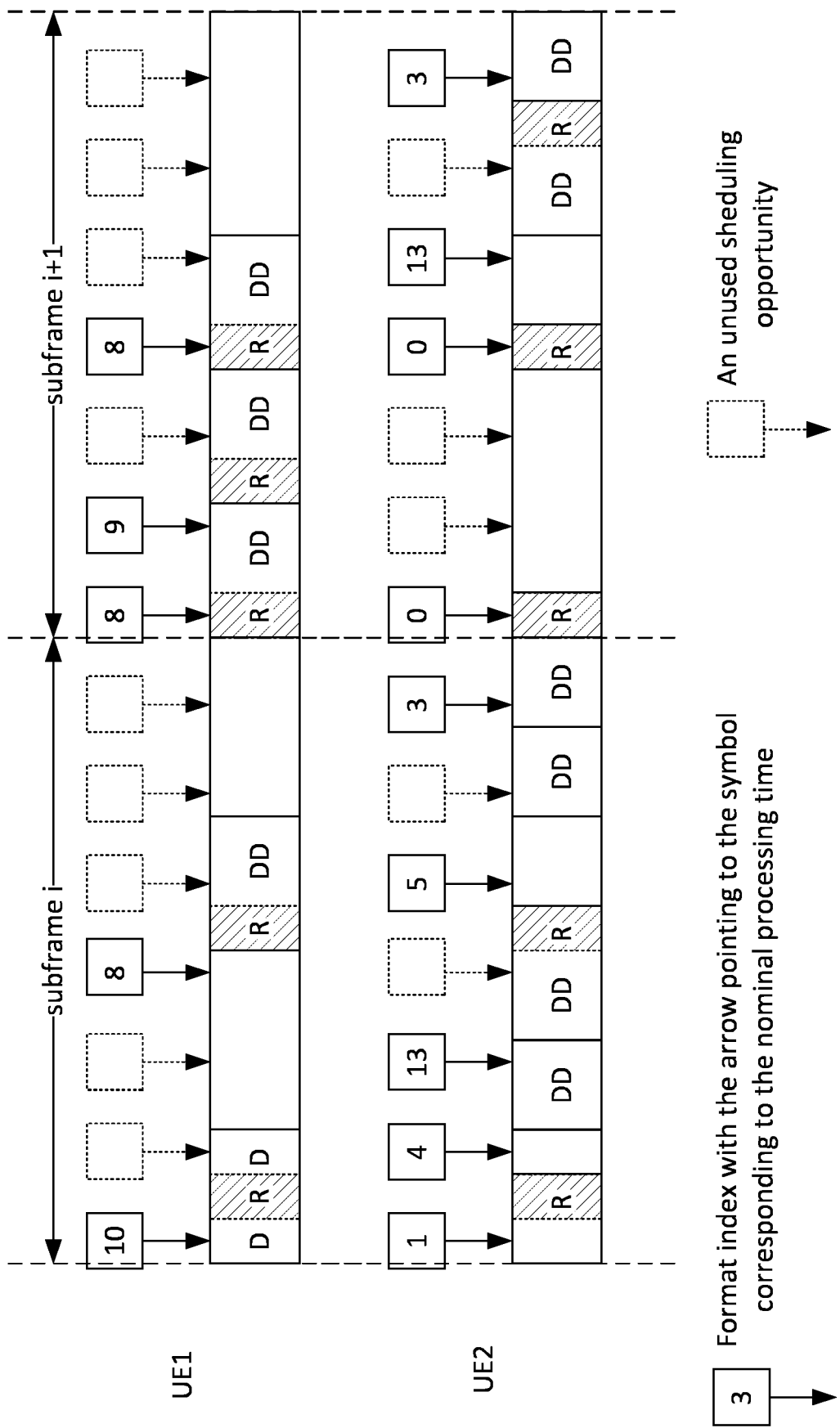
FIG. 4 illustrates multiplexing of two UEs in time, according to certain embodiments.

The following features illustrated and discussed with respect to table 1 in FIG. 2, and further illustrated and discussed with reference to FIGS. 3 and 4, are merely examples. Other implementations are also permitted.

In an example embodiment, pre-defined transmit formats are used to schedule the UE how to transmit with respect to a demodulation reference signal. FIG. 2 illustrates Table 1, a table of combinations of transmit formats, according to certain embodiments. Table 1 shows 13 combinations of transmit formats, where Formats 0-2 grant UE a transmission of single DMRS symbol, Formats 3-7 grant UE transmission of two data symbols and the rest of the formats grant both DMRS and two data symbols. Note that this table is only an example, with intention to keep the sTTI size in terms of the number data symbols constant, and more combinations could be defined or some of the combinations could be left out. Symbol 0 can be the UL symbol delayed by nominal minimum processing time delay with respect to a grant received on sPDCCH.

More particularly, Table 1 shows sTTI formats for UL DMRS (R) and data (D) symbol transmission. As mentioned above, symbol 0 can correspond to a nominal time of the grant. If that is empty, as in Format 4 for example, this can mean that the UE has to delay transmission with respect to the nominal starting time.

FIG. 3 illustrates an eNB scheduling different sTTI formats within five consecutive UL subframes, according to certain embodiments. The arrows always point to "Symbol 0" from Table 1, namely the UL symbol delayed by nominal delay with respect to UL grant received on PDCCH or sPDCCH. The number connected to an arrow corresponds to format index in the Table of FIG. 2. In this example, the eNB allocated all the UL symbols and no sTTI spans over subframe boundary. However, eNB could leave a UL symbol unused if it wishes to do so. Thus, FIG. 3 illustrates examples of UL grants with flexible DMRS symbol positions.

FIG. 4 illustrates multiplexing of two UEs in time, according to certain embodiments. In this example, UE1 is in moderate speed, which may require a DMRS symbol to be close to the data symbols. On the other hand, in this example UE2 is of low mobility and may reuse the DMRS symbols already transmitted a few symbols earlier. When DMRSs of the two UEs coincide, orthogonal DMRS sequences may be transmitted by UE1 and UE2. The DMRS orthogonality may be achieved by using different cyclic shifts or interleaved frequency division multiple access (IFDMA).

Thus, FIG. 4 illustrates flexible multiplexing of two UEs by transmitting overlapping orthogonal DMRSs in some symbols and data multiplexing in time.

There are alternative ways of signaling a format as shown in Table 1. For example, according to a first alternative three or four bits can be reserved in UL sTTI grant for indicating one of the formats. The three-bit approach may involve some scheduling constraints.

According to a second alternative, formats can be grouped, and downlink control information (DCI) can include a switch to a group. The DCI contents for different groups can be different but the DCI size can be the same.

As an example, there could be three groups corresponding to the following: only DMRS transmission, only data transmission, and both DMRS and data transmission. When group 1 is indicated, MCS bits may not be needed and can be used for indicating a format within group 1 or for other purposes. Similarly, when group 2 is indicated, the bits for selection of a DMRS cyclic shift may not be needed and can be used, for example, for indicating a format within group 2. Other ways of grouping are possible.

The switch to a group can be implemented explicitly by DCI bit(s) in a similar way to the way in which the differentiation of legacy DCI Format 0 and 1A is done. DCI Format 0 and 1A have the same size and one bit in the DCI indicates whether the DCI is for UL grant (Format 0) or a DL assignment (Format 1A). Another way could be to apply group dependent cyclic redundancy check (CRC) scrambling of DCI, which may involve essentially reserving multiple C-RNTIs, or using a combination of group dependent scrambling and explicit bits.

In addition to the scheduling flexibility illustrated in FIGS. 3 and 4, the signaling scheme of certain embodiments can enable efficient UL resource use when the number of scheduling instances in DL varies with the number of PDCCH symbols. This is illustrated in FIG. 5.

Figure 5:
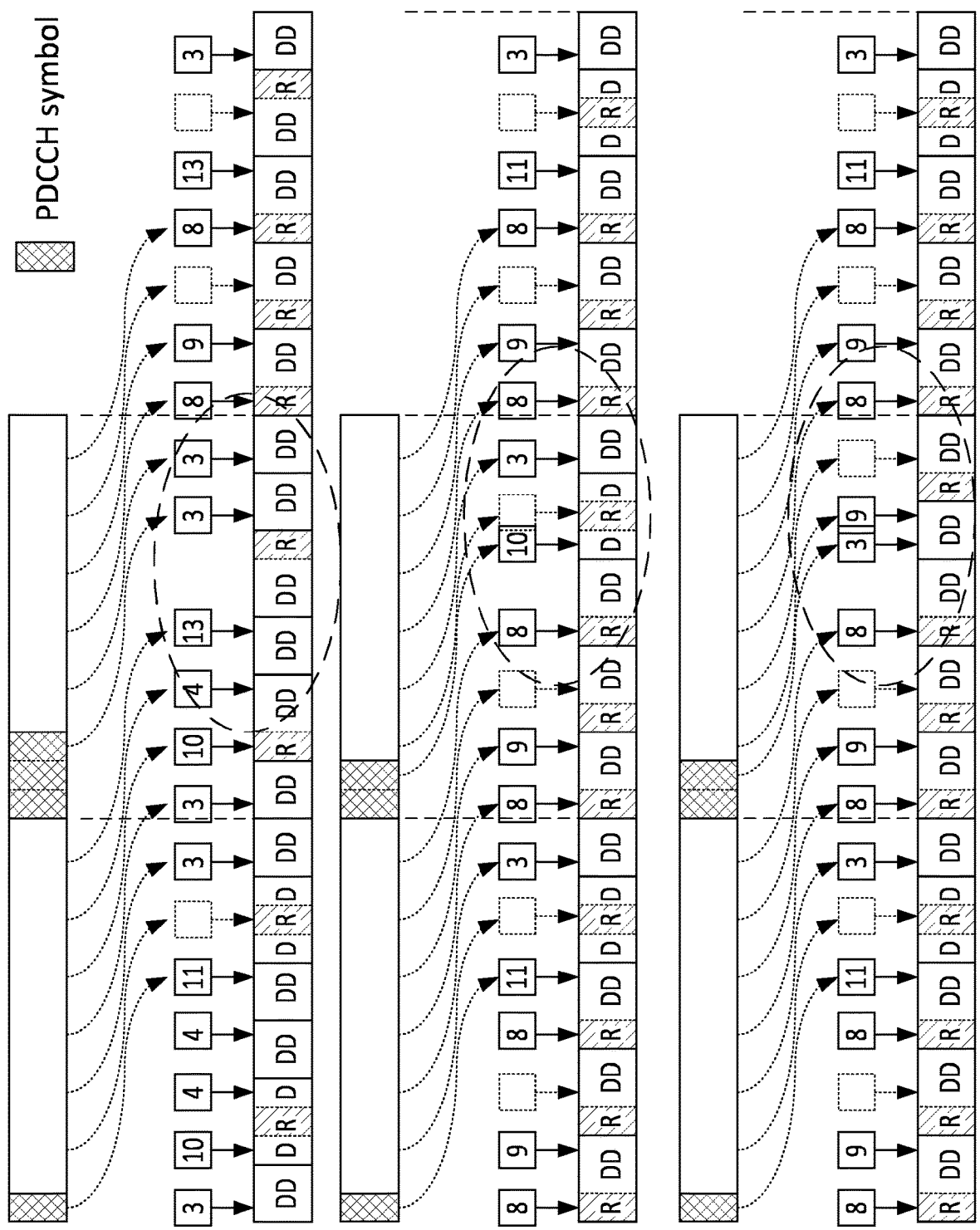
FIG. 5 illustrates some examples of UL grants for different numbers of PDCCH symbols, according to certain embodiments.

FIG. 5 illustrates some examples of UL grants for different numbers of PDCCH symbols, according to certain embodiments. The encoding of a DCI spreads it over all PDCCH symbols. Therefore, when an sTTI grant is given in PDCCH, its decoding can start only after receiving the last PDCCH symbol. This may involve losing one scheduling opportunity per subframe, as shown in the upper part of FIG. 5 for the case of three PDCCH symbols, or otherwise uneven separation between nominal scheduling times ("subframes 0"), as shown in the two lower examples in FIG. 5.

For these lower examples, it is assumed that even in case of two PDCCH symbols there could be seven sTTI UL grants per TTI, and different ways of adapting scheduling according to the number of PDCCH symbols is shown. However, the number of grants in case of two PDCCH symbols is still an open question and may be variously implemented. Note that the signaling scheme also allows many other ways besides the displayed ones. Nevertheless, in all cases eNB can make use of formats with delay and/or formats using 3 UL symbols in order to allocate all available UL symbols within subframes.

Figure 6:
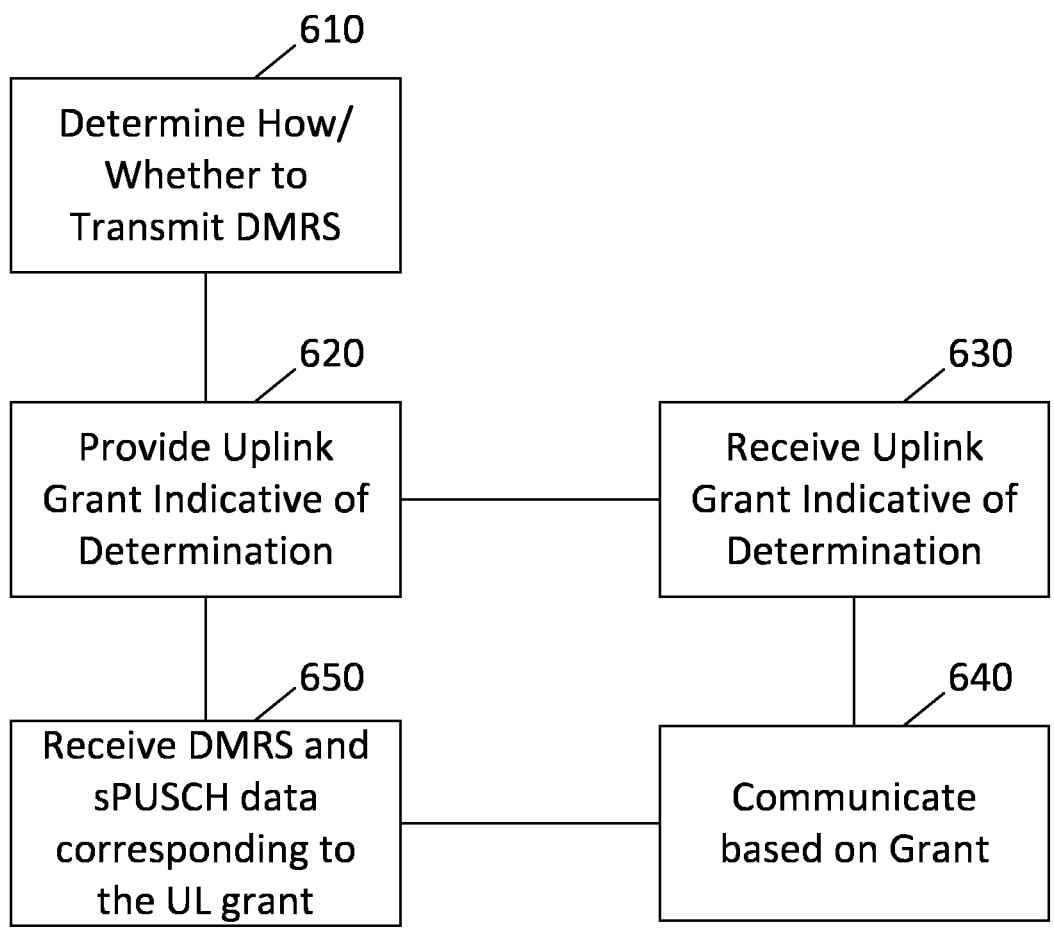
FIG. 6 illustrates a method according to certain embodiments.

FIG. 6 illustrates a method according to certain embodiments. As shown in FIG. 6, a method can include, at 610, determining how a user equipment is to transmit with respect to a demodulation reference signal. The determination can be on a case by case basis or can be preconfigured. The determination can be made at an access node, such as an eNB.

The determination can be one or more of the following: that the user equipment is to transmit only a demodulation reference signal without data symbols; that the user equipment is to transmit a plurality of data symbols without a demodulation reference signal; or that the user equipment is to transmit a plurality of data symbols and a demodulation reference signal. In addition, determination can include discontinuous transmission of data and demodulation reference signals. Furthermore, the determination can include that the user equipment is to transmit with delay compared with the nominal time from an UL grant to start of UL transmission.

The method can also include, at 620, providing uplink grant to schedule the user equipment to transmit according to the determination. The uplink grant can be configured to indicate a delay of one or two symbols with respect to a nominal delay.

The UL grant can be sent by the access node, such as eNB.

How the user equipment is to transmit with respect to a demodulation reference signal can involve transmitting according to a selected format of a set of formats, such as the format set forth in FIG. 2. The selected format can be signaled in an UL grant by a set of bits, such as three or four bits, indicating the format.

The formats can be grouped and downlink control information or other signaling can include a switch to a group. Within the group, a particular format can be indicated using modulation and coding scheme bits or demodulation reference signal cyclic shift bits, as described above. The downlink control information can include bits indicative of the group or the downlink control information can be subject to group dependent cyclic redundancy code scrambling.

The method can further include, at 630, receiving an uplink grant to schedule the user equipment to transmit according to a determination with respect to a demodulation reference signal. This can be the grant sent at 620 and the determination made at 610. The method can additionally include, at 640, communicating in uplink by the user equipment in accordance with the determination, for example using a format identified or otherwise indicated. The method can additionally include, at 650, the access node receiving DMRS and sPUSCH data transmission corresponding to the grant sent in 620.

Figure 7:
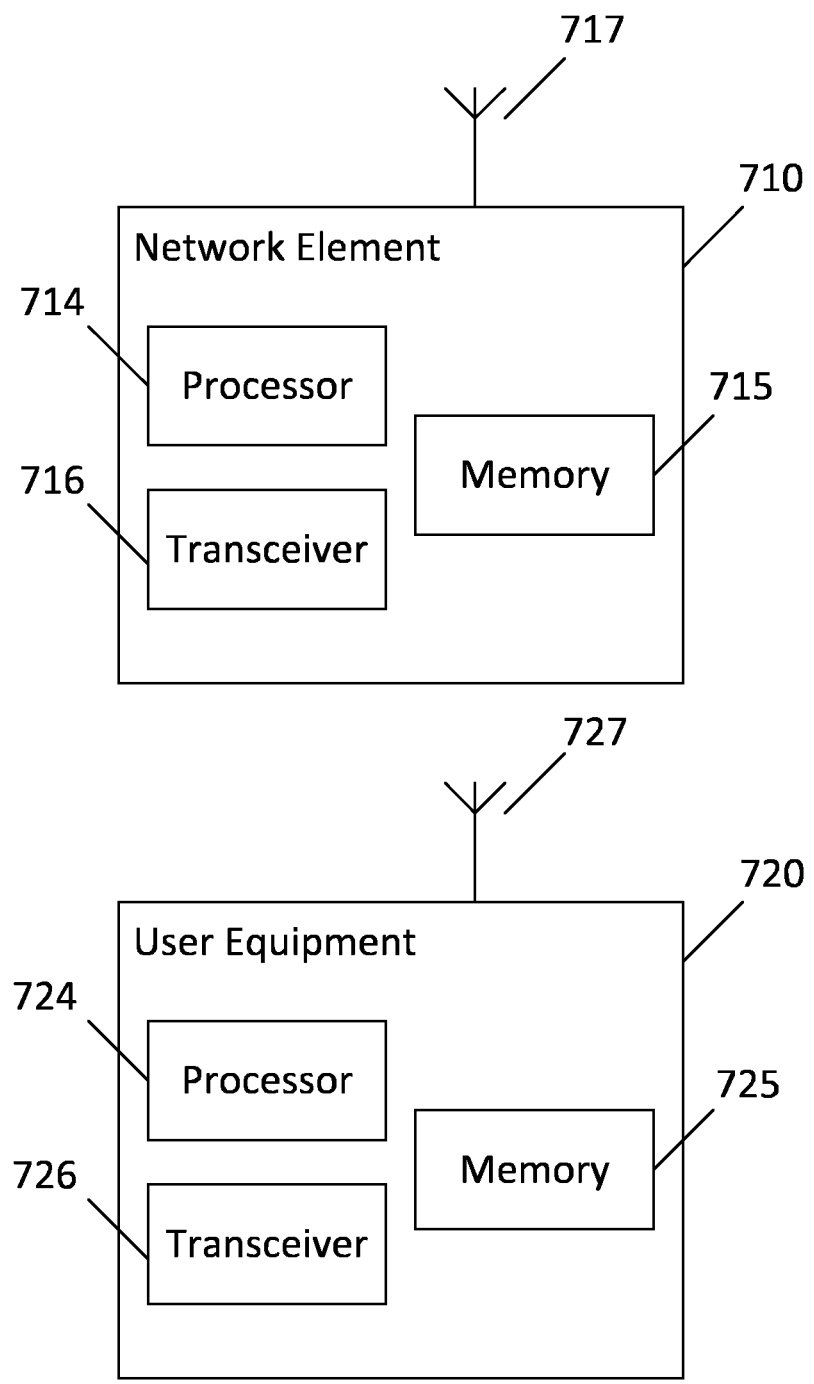
FIG. 7 illustrates a system according to certain embodiments.

FIG. 7 illustrates a system according to certain embodiments of the invention. It should be understood that each block of the flowchart of FIG. 6 may be implemented by various means or their combinations, such as hardware, software, firmware, one or more processors and/or circuitry. In one embodiment, a system may include several devices, such as, for example, network element 710 and user equipment (UE) or user device 720. The system may include more than one UE 720 and more than one network element 710, although only one of each is shown for the purposes of illustration. A network element can be an access point, a base station, an eNode B (eNB), or any other network element.

Each of these devices may include at least one processor or control unit or module, respectively indicated as 714 and 724. At least one memory may be provided in each device, and indicated as 715 and 725, respectively. The memory may include computer program instructions or computer code contained therein, for example for carrying out the embodiments described above. One or more transceiver 716 and 726 may be provided, and each device may also include an antenna, respectively illustrated as 717 and 727. Although only one antenna each is shown, many antennas and multiple antenna elements may be provided to each of the devices. Other configurations of these devices, for example, may be provided. For example, network element 710 and UE 720 may be additionally configured for wired communication, in addition to wireless communication, and in such a case antennas 717 and 727 may illustrate any form of communication hardware, without being limited to merely an antenna.

Transceivers 716 and 726 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 720 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 720 may be a sensor or smart meter, or other device that may usually be configured for a single location.

In an exemplifying embodiment, an apparatus, such as a node or user device, may include means for carrying out embodiments described above in relation to FIG. 6.

Processors 714 and 724 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 715 and 725 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 710 and/or UE 720, to perform any of the processes described above (see, for example, FIG. 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 7 illustrates a system including a network element 710 and a UE 720, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments have various benefits and/or advantages. For example, certain embodiments provide a constant number of data symbols per sPUSCH data transmission. Likewise, certain embodiments allow an eNB to flexibly grant DMRS positions according to needs of the UE, for example with respect to mobility. Additionally, certain embodiments provide a solution to a variable number of PDCCH symbols on subframe basis, which may cause a variable number of scheduling instances in DL as well as impacting the position of nominal "subframe 0".

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP Third Generation Partnership Program
CRC Cyclic Redundancy Check
C-RNTI Cell Radio Network Temporal Identifier
DCI Downlink Control Information
DL, D Downlink
DMRS DeModulation Reference Signal
eNB Enhanced NodeB
FDD Frequency Division Duplexing
FDM Frequency Division Multiplexing
HARQ Hybrid Automatic Retransmission request
LTE Long Term Evolution
OFDM Orthogonal Frequency Division Multiplexing
PCFICH Physical Control Format Indicator Channel
PDCCH Physical Downlink Control Channel
PDSCH Physical Downlink Shared Channel
PHICH Physical HARQ-ACK Indicator Channel
PUCCH Physical Uplink Control Channel
PUSCH Physical Uplink Shared Channel
RAN Radio Access Network
Rel Release
SI Study Item
sTTI Shorter TTI
sPUSCH Shorter PUSCH
TD Time Division
TDM Time Division Multiplexing
TTI Transmission Time Interval
UCI Uplink Control Information
UE User Equipment UL, U Uplink
WG Working Group
WI Work Item

The invention claimed is:

1. An apparatus, comprising:
   at least one processor; and
   at least one memory including computer program code, wherein the at least one memory and the computer program code are configured to, with the at least one processor, cause the apparatus at least to
   determine how a user equipment is to transmit with respect to a demodulation reference signal, wherein the determination is dependent on a mobility of the user equipment, and wherein the mobility of the user equipment determines a transmission proximity of the demodulation reference signal to a data symbol, and a transmission reusability of the demodulation reference signal; and
   provide an uplink grant to schedule the user equipment to transmit according to the determination.

2. The apparatus of claim 1, wherein the determination comprises:
   determine that the user equipment is to transmit only a demodulation reference signal without data symbols.

3. The apparatus of claim 1, wherein the determination comprises:
   determine that the user equipment is to transmit a plurality of data symbols without a demodulation reference signal.

4. The apparatus of claim 1, wherein the determination comprises:
   determine that the user equipment is to transmit a plurality of data symbols and a demodulation reference signal.

5. The apparatus of claim 1, wherein the uplink grant is configured to indicate a delay of one or two symbols with respect to a nominal delay.

6. The apparatus of claim 1, wherein the determination how the user equipment is to transmit with respect to a demodulation reference signal comprises transmitting according to a selected format of a set of formats.

7. The apparatus of claim 6, wherein the selected format is signaled by a set of bits indicating the format.

8. An apparatus, comprising:
   at least one processor; and
   at least one memory including computer program code, wherein the at least one memory and the computer program code are configured to, with the at least one processor, cause the apparatus at least to
   receive an uplink grant to schedule the apparatus to transmit according to a determination with respect to a demodulation reference signal, wherein the determination is based on a mobility of the apparatus, and wherein the mobility of the apparatus determines a transmission proximity of the demodulation reference signal to a data symbol, and a transmission reusability of the demodulation reference signal; and
   communicate in uplink by the apparatus in accordance with the determination.

9. The apparatus of claim 8, wherein the determination comprises:
   determine that the apparatus is to transmit only a demodulation reference signal without data symbols.

10. The apparatus of claim 8, wherein the determination comprises:
    determine that the apparatus is to transmit a plurality of data symbols without a demodulation reference signal.

11. The apparatus of claim 8, wherein the determination comprises:
    determine that the apparatus is to transmit a plurality of data symbols and a demodulation reference signal.

12. The apparatus of claim 8, wherein the uplink grant is configured to indicate a delay of one or two symbols with respect to a nominal delay.

13. The apparatus of claim 8, wherein the communicating in the uplink comprises transmitting according to a selected format of a set of formats.

14. The apparatus of claim 13, wherein the selected format is signaled by a set of bits indicating the format.

15. A method, comprising:
    receiving an uplink grant to schedule a user equipment to transmit according to a determination with respect to a demodulation reference signal, wherein the determination is based on a mobility of the user equipment, and wherein the mobility of the user equipment determines a transmission proximity of the demodulation reference signal to a data symbol, and a transmission reusability of the demodulation reference signal; and
    communicating in uplink by the user equipment in accordance with the determination.

16. The method of claim 15, wherein the determination comprises determining that the user equipment is to transmit only a demodulation reference signal without data symbols.

17. The method of claim 15, wherein the determination comprises determining that the user equipment is to transmit a plurality of data symbols without a demodulation reference signal.

18. The method of claim 15, wherein the determination comprises determining that the user equipment is to transmit a plurality of data symbols and a demodulation reference signal.

19. The method of claim 15, wherein the communicating in the uplink comprises transmitting according to a selected format of a set of formats.

20. The method of claim 19, wherein the selected format is signaled by a set of bits indicating the format.

* * * * *